US009129247B2

(12) United States Patent  
Hara et al.

(10) Patent No.: US 9,129,247 B2  
(45) Date of Patent: Sep. 8, 2015

(54) MANAGING THROUGHPUT FOR MULTIPLE PROCESSES IN A MATERIALS HANDLING FACILITY

(75) Inventors: Yusuke Hara, Tokyo (JP); Joseph M. Alyea, Edmonds, WA (US); Cherie G. Wong, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 339 days.

(21) Appl. No.: 12/788,117

(22) Filed: May 26, 2010

(65) Prior Publication Data

US 2011/0295644 A1 Dec. 1, 2011

(51) Int. Cl.
G06Q 10/00 (2012.01)
G06Q 10/08 (2012.01)
G06Q 10/06 (2012.01)

(52) U.S. Cl.
CPC .......... *G06Q 10/087* (2013.01); *G06Q 10/0639* (2013.01); *G06Q 10/06315* (2013.01)

(58) Field of Classification Search
CPC ..................................................... G06Q 10/00
USPC ...................................................... 705/7.216
See application file for complete search history.

(56) References Cited

U.S. PATENT DOCUMENTS

| 5,267,638 A * | 12/1993 | Doane ........................... 198/357 |
| 5,395,206 A * | 3/1995 | Cerny, Jr. ....................... 414/807 |
| 5,666,493 A * | 9/1997 | Wojcik et al. .................. 705/22 |
| 5,712,989 A * | 1/1998 | Johnson et al. ................ 705/28 |
| 5,720,157 A | 2/1998 | Ross |
| 6,141,647 A | 10/2000 | Meijer et al. |
| 6,182,053 B1 | 1/2001 | Rauber et al. |

(Continued)

FOREIGN PATENT DOCUMENTS

| JP | H05192852 | 8/1993 |
| JP | H08192906 | 7/1996 |

(Continued)

OTHER PUBLICATIONS

International Search Report and Written Opinion from PCT/US 11/38007, issued Sep. 22, 2011, Amazon Technologies, Inc., 18 pages.

(Continued)

*Primary Examiner* — David Rines  
*Assistant Examiner* — Venay Puri  
(74) *Attorney, Agent, or Firm* — Robert C. Kowert; Meyertons, Hood, Kivlin, Kowert & Goetzel, P.C.

(57) ABSTRACT

Various embodiments of a system and method for process management in a materials handling facility are described. Embodiments may include a process control component configured to generate a model of multiple unit handling processes of a materials handling facility. For each process, the model may indicate a measured throughput rate. The process control component may be configured to, based on at least one target output rate that is a goal for the output rate of a given unit handling process, evaluate the model to generate a particular target throughput rate that is a goal for the respective throughput rate of a particular unit handling process that is performed prior to the given unit handling process. The process control component may be configured to, based on the particular target throughput rate, generate one or more instructions to control the respective throughput rate of units processed by the particular unit handling process.

36 Claims, 8 Drawing Sheets

(56) References Cited

U.S. PATENT DOCUMENTS

| | | | |
|---|---|---|---|
| 6,256,544 B1* | 7/2001 | Weissinger | 700/1 |
| 6,286,292 B1* | 9/2001 | Spatafora et al. | 53/492 |
| 6,289,260 B1* | 9/2001 | Bradley et al. | 700/216 |
| 6,505,093 B1 | 1/2003 | Thatcher et al. | |
| 6,622,127 B1* | 9/2003 | Klots et al. | 705/28 |
| 7,139,637 B1* | 11/2006 | Waddington et al. | 700/216 |
| 7,499,766 B2* | 3/2009 | Knight et al. | 700/107 |
| 7,979,359 B1 | 7/2011 | Young et al. | |
| 8,061,506 B2* | 11/2011 | Schafer | 198/444 |
| 8,086,344 B1 | 12/2011 | Mishra et al. | |
| 8,408,380 B2* | 4/2013 | Doane | 198/460.1 |
| 2002/0049622 A1* | 4/2002 | Lettich et al. | 705/7 |
| 2002/0188530 A1* | 12/2002 | Wojcik et al. | 705/28 |
| 2003/0110102 A1 | 6/2003 | Chien et al. | |
| 2003/0149644 A1 | 8/2003 | Stingel, III et al. | |
| 2003/0195650 A1 | 10/2003 | Danielson et al. | |
| 2003/0200111 A1 | 10/2003 | Damji | |
| 2004/0028777 A1 | 2/2004 | Koke et al. | |
| 2004/0148047 A1* | 7/2004 | Dismukes et al. | 700/100 |
| 2004/0153187 A1* | 8/2004 | Knight et al. | 700/99 |
| 2004/0204775 A1 | 10/2004 | Keyes et al. | |
| 2005/0055286 A1 | 3/2005 | Zimet | |
| 2005/0102203 A1 | 5/2005 | Keong | |
| 2005/0209732 A1* | 9/2005 | Audimoolam et al. | 700/216 |
| 2006/0173568 A1* | 8/2006 | Jackson et al. | 700/108 |
| 2006/0206235 A1* | 9/2006 | Shakes et al. | 700/216 |
| 2006/0224254 A1 | 10/2006 | Rumi et al. | |
| 2006/0231295 A1 | 10/2006 | Yamaguchi et al. | |
| 2006/0235557 A1* | 10/2006 | Knight et al. | 700/103 |
| 2007/0021863 A1 | 1/2007 | Mountz et al. | |
| 2007/0043468 A1* | 2/2007 | Schaefer et al. | 700/216 |
| 2007/0050080 A1 | 3/2007 | Peck | |
| 2007/0198135 A1* | 8/2007 | Chang et al. | 700/300 |
| 2007/0233300 A1* | 10/2007 | Jones | 700/99 |
| 2007/0283590 A1 | 12/2007 | White et al. | |
| 2008/0009959 A1* | 1/2008 | Enright et al. | 700/96 |
| 2008/0167884 A1 | 7/2008 | Mountz et al. | |
| 2009/0099678 A1* | 4/2009 | Kurata et al. | 700/106 |
| 2009/0112675 A1 | 4/2009 | Servais | |
| 2009/0136333 A1* | 5/2009 | Schafer | 414/807 |
| 2009/0143887 A1* | 6/2009 | Jones | 700/99 |
| 2009/0287330 A1* | 11/2009 | Overley et al. | 700/96 |
| 2009/0288996 A1* | 11/2009 | Shafer | 209/546 |
| 2010/0114790 A1 | 5/2010 | Strimling et al. | |
| 2010/0125494 A1 | 5/2010 | Boss et al. | |
| 2010/0274610 A1 | 10/2010 | Andersen et al. | |
| 2011/0295413 A1 | 12/2011 | Hara et al. | |

FOREIGN PATENT DOCUMENTS

| | | | |
|---|---|---|---|
| JP | 2007272652 | 10/2007 | |
| WO | 2006017602 | 2/2006 | |
| WO | WO 2006017602 A1 * | 2/2006 | B65B 55/20 |

OTHER PUBLICATIONS

Koster, Le-Duc, Zaerpour, Determining the number of zones in a pick and sort order picking system, Nov. 15, 2011, pp. 757-771.

Office Action from Japanese Application No. 2013512225, issued Dec. 24, 2014, English and Japanese versions, pp. 1-4.

Office Action from Canadian Application 2800082, Dated Apr. 14, 2015, pp. 1-3.

* cited by examiner generating a stored model of multiple unit handling processes of a materials handling facility; the model indicating, for each unit handling process, a measured throughput rate at which that unit handling process processes units
500 based on at least one target output rate that is a goal for the output rate of a given unit handling process of the multiple unit handling processes, evaluating the model to generate a particular target throughput rate that is a goal for the respective throughput rate of a particular unit handling process that is performed prior to the given unit handling process
502 based on the particular target throughput rate generated for the particular unit handling process, generating one or more instructions to control the respective throughput rate of units processed by the particular unit handling process
504

FIG. 5

MANAGING THROUGHPUT FOR MULTIPLE PROCESSES IN A MATERIALS HANDLING FACILITY

BACKGROUND

Electronic marketplaces, such as those accessible via the Internet, may include a catalog of items or products available for purchase. These items may be offered as the basis for commerce (e.g., sale or trade). In one example, customers may utilize a web browser to visit a merchant's website, select an item for purchase from the catalog, and engage in a checkout process to finalize an order for the item. The merchant may operate a fulfillment network including various facilities in order to process such orders. For instance, the merchant may include a facility that prepares shipments of purchased items. A shipment carrier may acquire such shipments from the merchant and deliver the shipments to the respective purchasing customers.

The facilities operated by the merchant may include various fulfillment processes for fulfilling orders submitted by customers. These processes may operate on items to perform various tasks, such as preparing items for shipment. In some cases, some processes may be performed in a sequential fashion. For instance, a picking process that picks items out of inventory may need to be performed before a packing process that packs the items into a shipment. In some cases, poor performance of a process may cause an accumulation of items between processes. For example, poor performance by a packing process may cause an accumulation of picked items that need to be packed for shipping. Such processing variabilities may contribute to a facility's inability to reach its full processing capability.

BRIEF DESCRIPTION OF THE DRAWINGS

FIG. 5 illustrates a flowchart of an example method for controlling a throughput rate of units within the materials handling facility.

While the system and method for process management in a materials handling facility is described herein by way of example for several embodiments and illustrative drawings, those skilled in the art will recognize that the system and method for process management in a materials handling facility is not limited to the embodiments or drawings described. It should be understood, that the drawings and detailed description thereto are not intended to limit the system and method for process management in a materials handling facility to the particular form disclosed, but on the contrary, the intention is to cover all modifications, equivalents and alternatives falling within the spirit and scope of the system and method for process management in a materials handling facility as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Figure 1:
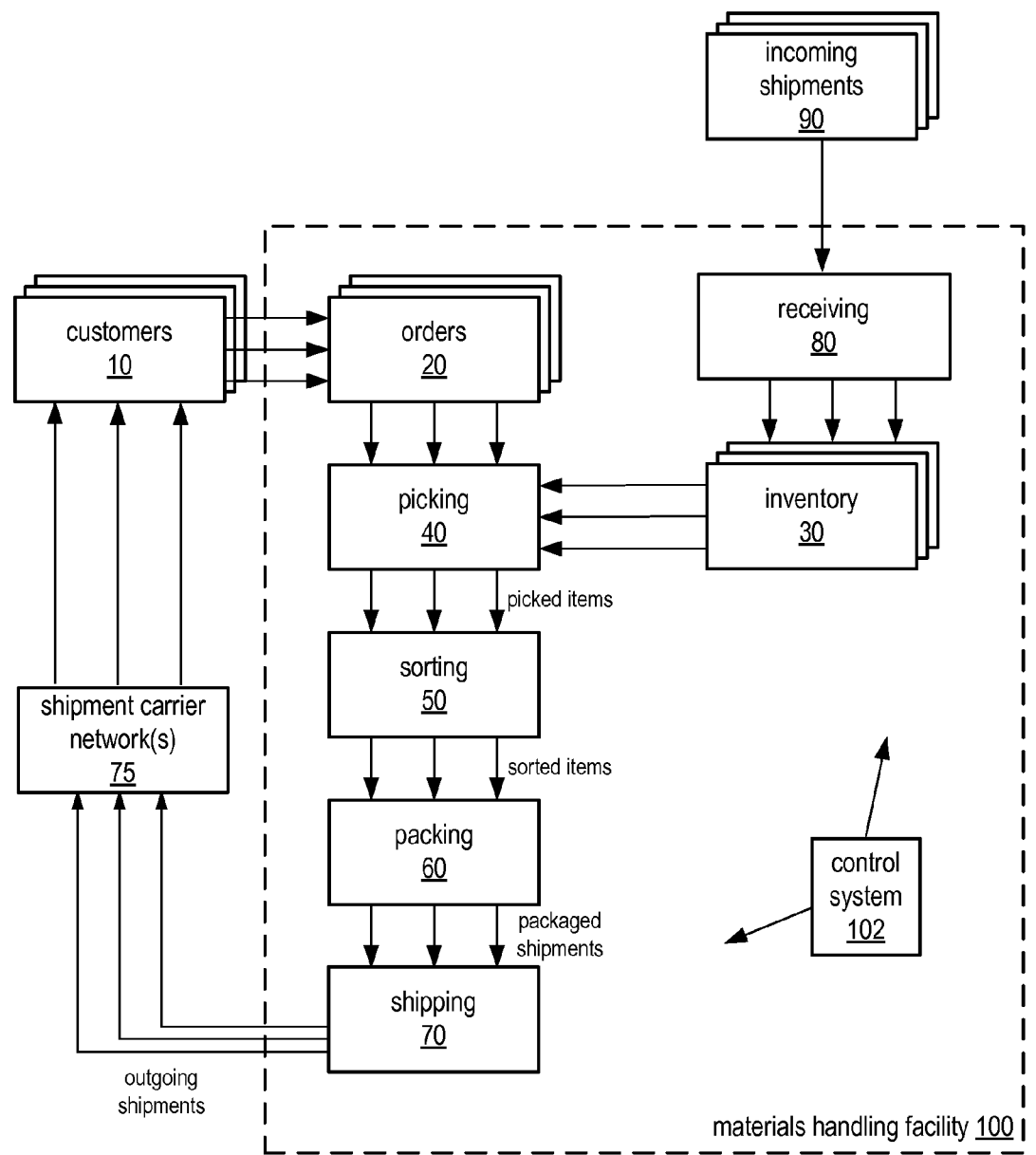
FIG. 1 illustrates a logical representation of the operations of a materials handling facility, according to some embodiments.

Various embodiments of a system and method for process management in a materials handling facility are described. FIG. 1 illustrates a logical representation or view of the operation of a materials handling facility 100 of various embodiments of the system and method for process management in a materials handling facility. In various embodiments, a fulfillment network including multiple materials handling facilities (each of which may be configured in a manner similar to that of materials handling facility 100) may be responsible for fulfilling multiple orders, such as orders placed through an electronic commerce ("e-commerce") portal.

In various embodiments, a materials handling facility may include one or more facilities that process, store, and/or distribute units of items including but not limited to warehouses, distribution centers, hubs, fulfillment centers, nodes in a supply chain network, retail establishments, shipping facilities, stock storage facilities, or any other facility configured to process units of items. For example, this Figure may illustrate an order fulfillment center of a product distributor, according to some embodiments. Multiple customers 10 may submit orders 20 to the product distributor through an e-commerce portal or other electronic marketplace, where each order 20 specifies one or more items from inventory 30 to be shipped to the customer that submitted the order. To fulfill the customer orders 20, the one or more items specified in each order may be retrieved, or picked, from inventory 30 (which may also be referred to as stock storage) in the materials handling facility, as indicated at 40. Picked items may be delivered or conveyed, if necessary, to one or more stations in the materials handling facility for sorting 50 into their respective orders, packing 60, and finally shipping 70 to the customers 10. In various embodiments, picked items may be delivered to a station where individual units of items are associated with and placed into particular conveyance receptacles, which are then inducted into a conveyance mechanism. The conveyance receptacles may then be routed to particular destinations for the items contained within the receptacles in accordance with the requests (orders) currently being processed, e.g. to sorting stations, under direction of a control system (e.g., control system 102). A picked, packed and shipped order does not necessarily include all of the items ordered by the customer; an outgoing shipment to a customer may include only a subset of the ordered items available to ship at one time from an inventory storage location.

A materials handling facility may also include a receiving 80 operation for receiving shipments of stock (e.g., units of inventory items) from one or more sources (e.g., vendors) and for moving or "stowing" the received stock into stock storage (e.g., inventory 30). The receiving 80 operation may also receive and process returned purchased or rented items or orders from customers. At least some of these items are typically returned to inventory 30. The various operations of a materials handling facility may be located in one building or facility, or alternatively may be spread or subdivided across two or more buildings or facilities. In various instances, it should be understood that references to elements, units, items, processes (or anything else) as being located within materials handling facility 100 may easily be extended to encompass elements, units, items, processes (or anything else) proximate to but not physically located within materials handling facility. For example, various elements, units, items, or processes (or anything else) may be implemented outside of the materials handling facility, according to some embodiments.

In various embodiments, shipments of one or more items at shipping 70 may be transferred to one or more shipment carrier network(s) 75. Each shipment carrier's network may include one or more distribution facilities for storing items as well as vehicles for conveying shipments from such distribution facilities and/or materials handling facilities (such as materials handling facility 100) to various destinations (e.g., customer specified destinations).

Figure 2:
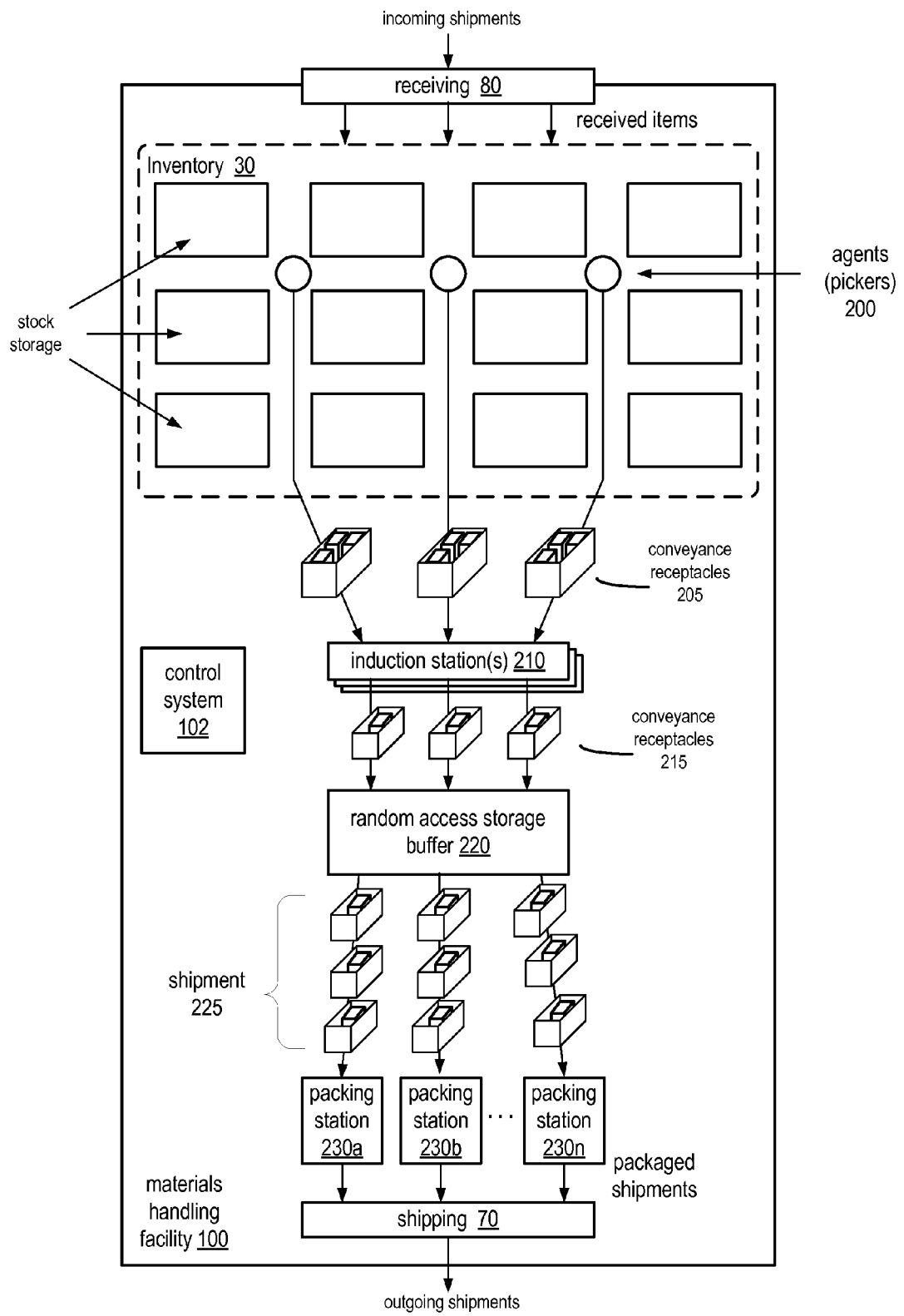
FIG. 2 illustrates an example physical layout for a materials handling facility, according to some embodiments.

FIG. 2 illustrates an exemplary physical layout of a materials handling facility, such as an order fulfillment facility or center, in which embodiments of the system and method for process management in a materials handling facility are implemented. Requests (e.g., orders) for items from requestors may be divided among multiple pickers 200, who then pick items from inventory storage 30. Picked units of items may be placed into conveyance receptacles 205 (e.g., totes or carts) for conveyance. The orders may be subdivided among the pickers 200; therefore, two or more of the pickers 200 may pick items for one order. The picked items may be conveyed to an induction station 210 or stations (there may be more than one induction station 210). For example, the picked items in conveyance receptacles 205 (e.g., totes) each containing one or more units of items (each possibly containing items from two or more orders) may be conveyed to any of inductions stations 210 on a conveyance device (e.g., a conveyor belt).

At the induction station 210, each unit may be pulled individually from each conveyance receptacle 205. Alternatively, all items may be "dumped" into a common receptacle (a bin, basket, shelf, etc.), and individual units may then be pulled from the common receptacle. In various embodiments, each pulled unit is then placed into a conveyance receptacle 215 (e.g., a tote or tray) by itself. This process may be referred to as singulating the item. Receptacles, as used herein, may include, but are not limited to, any tote, basket, box, tray, or similar mechanism configured to receive individual units of items or groups of units of items in a materials handling facility. The conveyance receptacle 215 need not be fixed to any conveyance mechanism.

The pulled unit of an item may be associated with the particular conveyance receptacle 215 it is placed in. In one embodiment, the association of a unit of an item with a particular conveyance receptacle 215 may be performed by reading, scanning or otherwise entering an item identifier associated with the item and a conveyance receptacle identifier associated with the particular conveyance receptacle 215 into which the unit is placed. The item identifier and receptacle identifier may be communicated to a control system 102 of the materials handling facility via wired and/or wireless communications. Each conveyance receptacle 215 may include a unique conveyance receptacle identifier that uniquely identifies the particular conveyance receptacle 215 in the materials handling facility. The conveyance receptacle identifier may, for example, be indicated by a bar code, Radio Frequency Identifier (RFID) device, or some other scannable or readable mechanism, mark, or tag attached to or integrated with the conveyance receptacle 215.

Each unit of each item carried in inventory 30 may include an item identifier. A type of item held in inventory 30 may be referred to herein as simply an item. The term item identifier may refer to a unique identifier associated with each particular type of item carried in inventory 30 of a distribution system. The term unit may be used to refer to one (unit) of a type of item. Typically, but not necessarily, each unit is tagged or otherwise marked with the item identifier. For example, units or collections of items in inventory may be marked or tagged with a bar code, Universal Product Code (UPC), Stock-Keeping Unit (SKU) code, serial number, and/or other designation (including proprietary designations) that may be used as item identifiers to facilitate materials handling facility operations, including, but not limited to, stowing, rebinning, picking, sorting, packing and shipping. These designations, or codes, may identify items by type, and/or may identify individual items within a type of item.

Cases, boxes, bundles, or other collections of units of items may similarly be marked or tagged with item identifiers. The units of items in a collection may all be of the same type of item, for example a case of twelve units of a particular item, or may be a collection of one or more units of each of two or more heterogeneous items. A collection of units of item(s) (e.g., a case containing twelve units of an item, or a bundle containing one or more units of each of two or more heterogeneous items, such as a boxed or bundled set of three different books) may thus be considered or treated as a "unit" in the order fulfillment process. A designation, or code, may thus also identify a collection of units of item(s) as a "unit" in the order fulfillment process. Thus, various, in addition to sorting individual units of items, may also process collections of units of item(s) designated as units. Therefore, the conveyance receptacles described herein may receive collections of units of item(s) that are designated as units as well as individual units of items.

Figure 8:
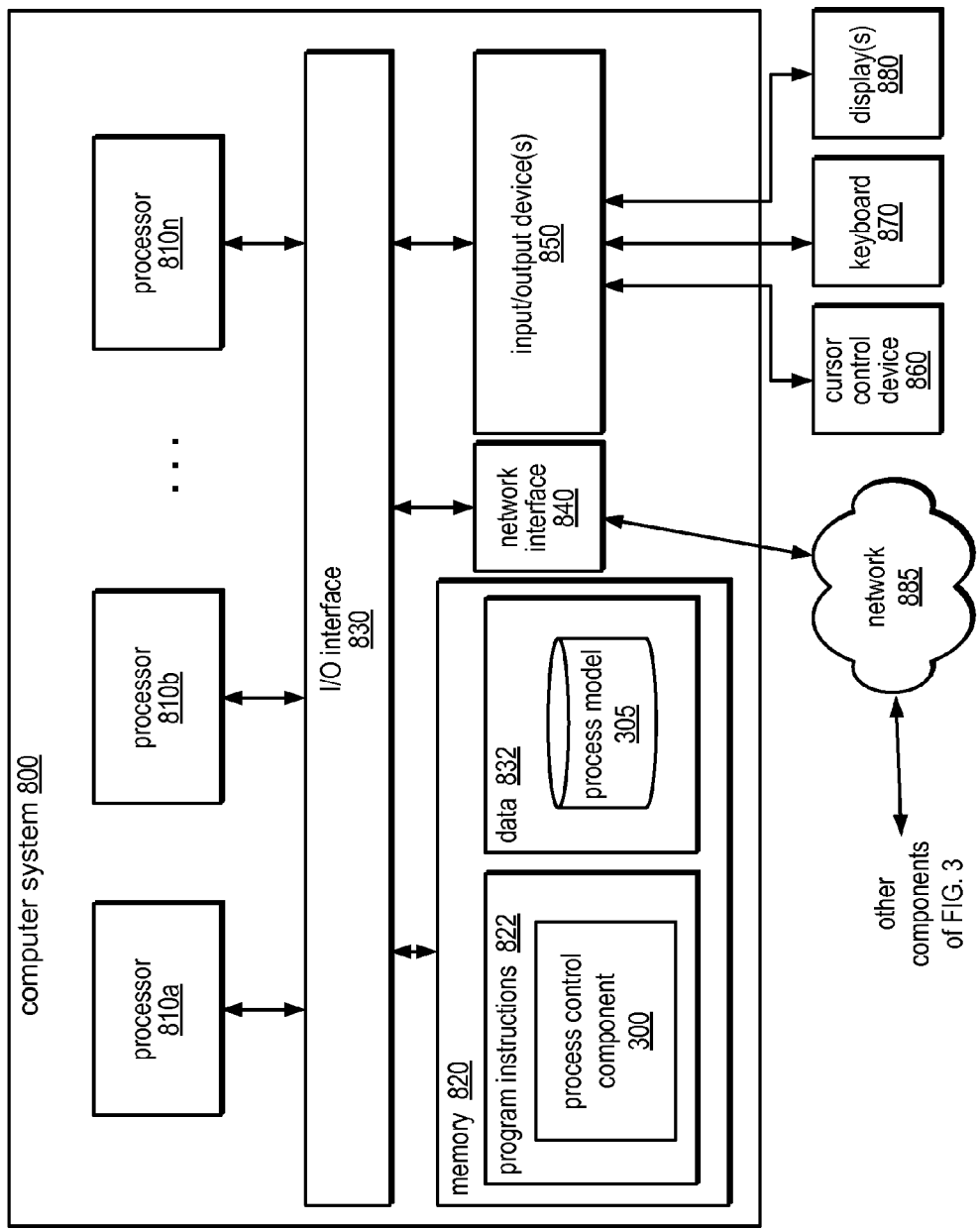
FIG. 8 illustrates one example of a computer system suitable for implementing various elements of the system and method for process management in a materials handling facility, according to some embodiments.

A materials handling facility may include a control system 102 which may include, but is not limited to, one or more computer systems, one or more data storage devices, one or more wired and/or wireless networks, control system software (programs, modules, drivers, user interfaces, etc.), and one or more hand-held, mobile and/or fixed readers, scanners or scanning devices that may be able to scan, receive, or otherwise detect the marks or tags (e.g., bar codes, radio frequency identification (RFID) tags, etc.) on individual items (units) or collections of items (e.g., cases) and communicate with a control station or stations of the control system to, for example, determine and record the item and/or item type of the items. The hand-held, mobile and/or fixed readers, scanners or scanning devices may also be able to scan, receive, or otherwise detect the marks or tags (e.g., bar codes, radio frequency identification (RFID) tags, etc.) attached to or integrated with the conveyance receptacles. An exemplary computer system that may be used in a control system 102 is illustrated in FIG. 8.

At the induction station 210, a pulled unit of an item may be associated with a particular conveyance receptacle 215 by reading, scanning, etc. the item identifier associated with the item and the conveyance receptacle identifier associated with the conveyance receptacle 215 into the control system 102. This may be performed manually (e.g., by an operator or agent using a hand-held scanner), via an automated scanning/reading process using fixed scanners/readers, or by a combination of manual and automatic scanning/reading. For example, an operator at the induction station 210 may use a hand-held scanner to scan a code off the unit of the item before or during placement of the unit into a "staged" conveyance receptacle 215, while an automated reader may read (or may have already read) the conveyance receptacle identifier from the conveyance receptacle 215 that is "staged" for the operator to place the unit of the item into.

Once a pulled unit of an item is associated with and placed into a particular conveyance receptacle 215, the conveyance receptacle 215 may be inducted into a conveyance mechanism (e.g., a conveyor belt, roller system, or other conveyance mechanism) to be conveyed to random access storage buffer 220. In various embodiments, the conveyance mechanism may include a mechanism that includes some method of diverting a product off a conveyance path under control of the control system. Examples of such diversion mechanisms may include, but are not limited to, sliding shoe sorter mechanisms and pop up diversion mechanisms, such as pop up wheel sorter mechanisms. A pop up wheel sorter includes powered wheels that rise up out of the conveyor to divert product off the conveyor onto a different path or to a location. Other types of mechanisms may be used in various embodiments.

The conveyance receptacle 215 may already be on the conveyance mechanism when the unit is associated with and placed into the receptacle 215. Alternatively, a conveyance receptacle 215 may be retrieved from a conveyance receptacle storage, stack, or other supply, the unit may be associated with and placed into the receptacle 215, and the receptacle 215 may then be inducted into or placed on the conveyance mechanism. The conveyance receptacles 215 need not be fixed to the conveyance mechanism; instead, the receptacles 215 may be removable bins, trays, totes, or similar devices. The conveyance mechanism may be coupled to and controlled by the materials handling facility control system 102 via wired and/or wireless communications. The control system 102 may receive input from and send commands to the conveyance mechanism to direct or control various operations of the conveyance mechanism.

The above describes aspects of an induction station 210 in which a human operator performs at least a portion of the pulling of units of items from groups of picked items, scanning/reading the items and receptacles 215 to associate single units of items to particular conveyance receptacles 215, and placing the units into the conveyance receptacles 215. In alternative embodiments, some or all of the activities described as being performed by a human operator may be performed by automated mechanisms, which may be coupled to and under control of the materials handling facility control system 102.

Inducted items stored in conveyance receptacles 215 may be delivered to a random access storage buffer 220. Random access storage buffer 220 may in various embodiments be configured to store multiple conveyance receptacles (each including a unit of an item) in respective buffer locations. In some embodiments, random access storage buffer 220 may include shelving units or other physical structures with columns and rows defining addressable locations or "slots" in which one or more conveyance receptacles 215 may be stored. In some embodiments, random access storage buffer may include automated or robotic mechanisms (e.g., multi-directional lifts or elevators) that may acquire an inducted conveyance receptacle 215 and place such receptacle into a respective addressable location of the random access storage buffer. Similar mechanisms may be utilized to remove conveyance receptacles (each including an item) from random access storage buffer 220. In various embodiments, random access storage buffer may be a two-sided structure such that conveyance receptacles may be placed into addressable locations of the buffer from one side of the buffer (e.g., an ingress side) and removed from another side of the buffer (e.g., an egress side).

Note that a conveyance receptacle including an item may be stored within random access storage buffer 220 for varying quantities of time (e.g., relatively short or relatively long periods of time). In some cases, conveyance receptacles that include units of the same shipment may arrive at the random access storage buffer at different times (e.g., due to picking variabilities). In some embodiments, conveyance receptacles including such units (typically one unit per receptacle) may not be eligible to be removed or "released" from the random access storage buffer until all of such units are present within the buffer. Shipments eligible for release may be removed from random access storage buffer 220 when directed by a computer system managing the buffer.

In various embodiments, random access storage buffer 220 may be controlled by control system 102 or by a dedicated buffer management component. In various embodiments, the buffer management component may control any and/or all aspects of the random access storage buffer 220, including but not limited to the physical mechanisms (e.g., robotic arms, lifts, elevators, etc.) that control the ingress and egress of conveyance receptacles 215 into and out of random access storage buffer 220.

In various embodiments, units may be released from random access storage buffer 220 and provided to a respective one of packing stations 230a-230n (collectively referred to as packing stations 230) on a per shipment basis. For instance, the conveyance receptacles including units that makeup shipment 225 may be released from random access storage buffer 220 and provided to packing station 230a. In various embodiments, each packing station may be configured to request one or more shipments depending on a measure of that packing stations current workload.

At each packing station, shipments of items (e.g., shipment 225) may be packed into a respective shipping container (e.g., corrugated box or other shipping container) for shipment from the materials handling facility. Prepared shipments may be processed at shipping 70 and conveyed to a shipment carrier for delivery to respective customers.

The illustrated materials handling facility also includes multiple unit handling processes. Generally, any process that moves a unit from location within the materials handling facility to another location may be considered a unit handling process. For example, picking units of items from inventory 30 to conveyance receptacles 205 may be a unit handling process. The movement of conveyance receptacles 205 to induction stations 210 may also be a unit handling process. Likewise the conveyance of receptacles 215 from inductions stations 210 to random access storage buffer 220 may be a unit handling process. The release of shipments from random access storage buffer 220 to packing stations 230 may also be a unit handling process. In various embodiments, each of these unit handling processes may have a respective throughput rate (e.g., units per hour).

Various embodiments of the system and method for process management in a materials handling facility may control one or more of the unit handling processes to efficiently utilize resources of the materials handling facility without exceeding known constraints of the materials handling facility. As described in more detail below, this may in some cases include managing the throughput rate of one or more of the unit handling processes. Constraints may include the unit capacity of induction stations 210 or random access storage buffer 220, for example.

Figure 3:
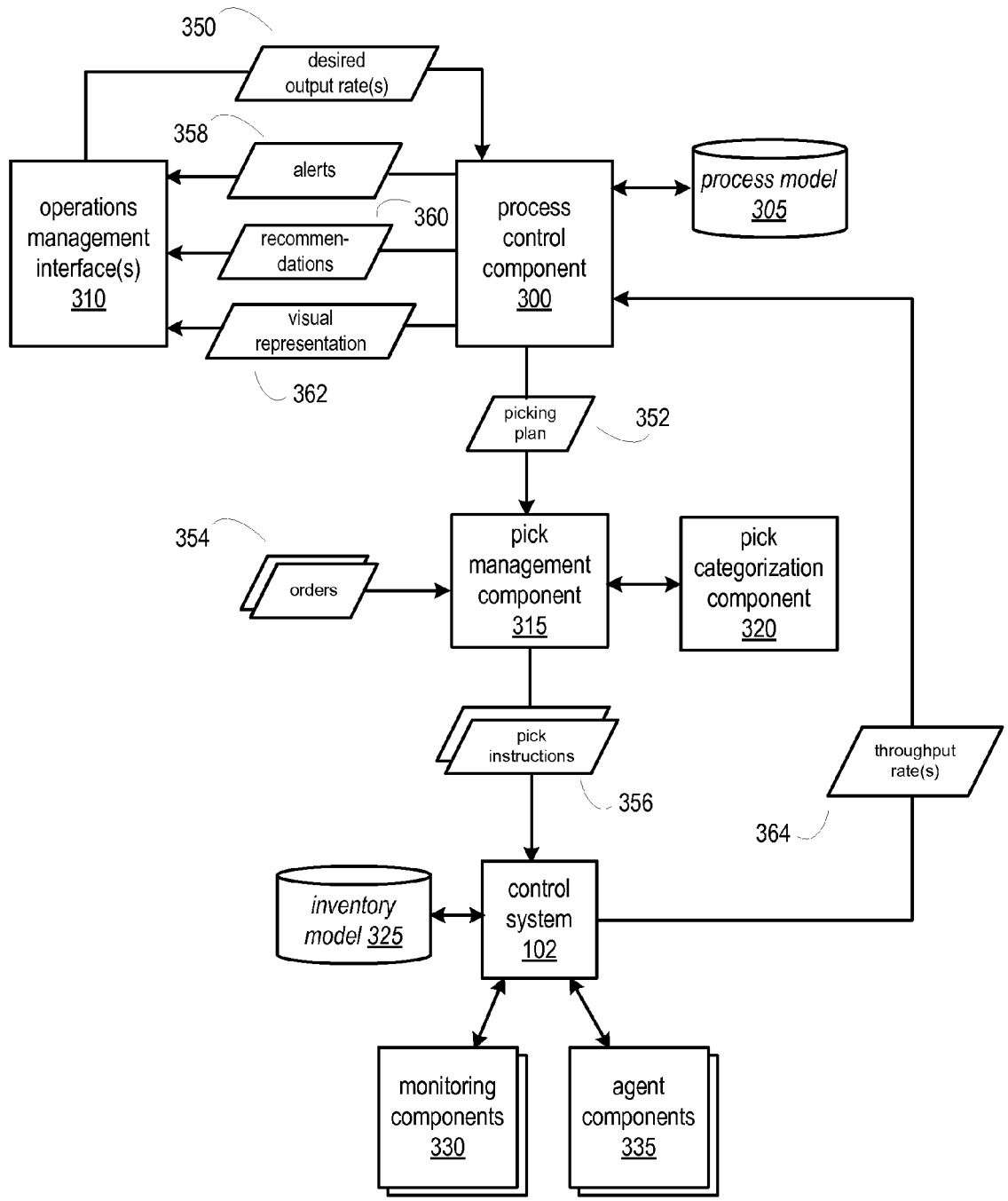
FIG. 3 illustrates an example system configuration including a process control component, according to some embodiments.

FIG. 3 illustrates an example system for implementing embodiments of the system and method for process management in a materials handling facility. Embodiments may include a process control component 300 configured to control the various unit handling processes described above. In various embodiments, process control component 300 may be configured to generate a process model 305. Process model 305 may include a model of the unit handling process of materials handling facility 100. In various embodiments, for each unit handling process, process model may specify the current throughput (e.g., real-time or near real-time throughput) or historical throughput rates of that unit handling process. For instance, for a picking process, the process model may specify the quantity of units being picked per period of time (e.g., units picked per hour). In other examples, the process model may specify the units per hour conveyed to induction station 210, units per hour conveyed to random access storage buffer 220, and units per hour conveyed to pack stations 230. The process model 305 may also specify the output rate of packing stations 230.

For each of different collections of units within the materials handling facility 100, process model 305 may specify the quantity of units within such collection. For instance, collections of units may reside in between unit handling processes within the materials handling facility, such as the collection of units stored at inventory 30, induction station(s) 210, random access storage buffer 220, and packing stations 230. The process model 305 may also specify the specific units within each collection. For example, units may be associated with the conveyance receptacles in which they reside. Furthermore, each conveyance receptacle may be associated with a respective location of the materials handling facility (e.g., inventory 30, an indication station 210, random access storage buffer 220, a packing station 230). In this way, process model 305 may provide process control component 300 with a holistic view of the processes and units within the materials handling facilities. As described in more detail below, process control component 300 may evaluate process model 305 to control the flow of units within materials handling facility 100.

Process control component 300 may utilize process model 305 and desired output rates 350 to control the processing of units within the materials handling facility. In various embodiments, desired output rate(s) may specify one or more output rates desired for the packing stations of the materials handling facility. In various embodiments, a desired output rate may be received from an operations management interface 310. For instance, operations management interface 310 may be a computer system through which a management entity submits one or more desired output rates, which are then provided to the process control component. In various embodiments, different packing stations 210 may be associated with different packing station types; there may be a distinct desired output rate 350 for each packing station type. In some embodiments, different types of packing stations 210 may have different processing capabilities. For instance, one packing station may process only small shipments whereas other packing stations may process only medium or only large shipments. In some cases, some packing stations may process some combination of shipment types, such as a combination of small and medium or a combination of medium and large shipments.

In various embodiments, process control component 300 may control the unit handling processes of the materials handling facility by controlling at least a portion of the picking process of picking units of items into conveyance receptacles 205. In one embodiment, the desired output rate(s) 350 may be utilized to determine a collective output for upstream processes within the materials handling facility. For example, if the collective output rate specified by output rates 350 were 700 UPH (units per hour), the process control component may determine that target throughput rates for one or more upstream processes should also be 700 UPH. This calculation may trickle up to the picking process, which may also be assigned a target throughput rate of 700 UPH. The target throughput rate for the picking process may serve as a goal to be met by the agents that carry out picking. As described in more detail below, variabilities in picking and other unit handling processes may cause the process control component to adjust the target throughput rate over time.

To control the throughput of the unit handling processes, process control component 300 may be configured to generate a picking plan 352. Picking plan 352 may include one or more instructions to pick a particular throughput rate of units (e.g., a particular quantity of units per hour). This throughput rate may be the same as the target throughput rate determined by evaluating process model 305 and desired output rate(s) 350. In cases where packing stations 230 are not limited to packing a certain types of shipments (e.g., each pack station is capable of packing any type of shipment), picking plan 352 may specify one overall throughput rate for the picking unit handling process. In other cases, desired output rate(s) 350 may specify separate output rates for units of different types of shipments (e.g., small, medium, and large shipments, etc.). In these cases, picking plan 352 may specify picking throughput rates for each unit belonging to different size shipments. For instance, an example picking plan 352 may specify that 100 units of large shipments are to be picked per hour, 200 units of medium shipments are to be picked per hour, and 400 units of small shipment are to be picked per hour. Of course, other shipment size granularities may be utilized in other embodiments (e.g., extra-small, extra-large, etc.). In various embodiments, these shipment types may generally correspond to the volumetric displacement of a shipment and not necessarily the size of the units themselves. For instance, a large shipment may be comprised of many small units or comprised of one large unit. As described in more detail below, embodiments may include a pick categorization component 320 configured to, for a given unit to be picked, provide the shipment type (e.g., small, medium, large, etc.) of the shipment to which the given unit belongs.

Pick management component 315 may be configured to generate pick instructions 356 in accordance with picking plan 352. Pick instructions 356 may include instructions that are sent to agents 200 that pick units out of inventory 30 into conveyance receptacles 205. In one example, a pick instruction 356 may specify a unit of a particular item is to be picked from a particular inventory location of inventory 30.

Pick management component 315 may be configured to generate pick instructions 356 for shipments of various orders 354. For each shipment of an order 354 (some orders may be divided into multiple shipments), pick management component 315 may be configured to query pick categorization component 320 for the shipment type of that shipment. The pick management component 315 may utilize such information to provide the appropriate quantity of pick instructions for each shipment type. In one non-limiting example, as described above, picking plan 352 may specify that 100 units of large shipments are to be picked per hour, 200 units of medium shipments are to be picked per hour, and 400 units of small shipment are to be picked per hour. Pick management component 315 may utilize the pick categorization component results to provide the appropriate quantity of picking instructions for each type of shipment of the picking plan. In this example, based on the results provided by pick categorization component 320, pick management component 315 may provide 100 pick instructions for units belonging to large shipments, 200 pick instructions for units belonging to medium shipments, and 400 instructions for units belonging to small shipments.

In various embodiments, agent component(s) 335 may be mobile communication devices or other electronic devices that may be associated with agents performing work within the materials handling facility. In some embodiments, an agent component 335 may be implemented by a computer system, such as that of FIG. 8 described below. In various embodiments, agent components 335 may be mobile or handheld devices that are carried by agents within the materials handling facility. Agent components 335 may communicate with control system 102 to send and receive information or commands, such as the location of units handled by the agent. For instance, in various embodiments, units within the materials handling facility may include or may be labeled with one or more identifiers (e.g., barcodes, stock keeping units or "SKUs", etc.). These identifiers may be specific to a particular item type (e.g., a particular model of a television) or specific to a particular unit of that item type (e.g., a particular unit of that television). Agent components may be configured to read (or "scan") these identifiers utilizing various components including but not limited to optical scanners (e.g., to scan barcode identifiers) or radio frequency identifier (RFID) scanners.

In various embodiments, control system 102 (including process control component 100) may track inventory based on input from one or more of agent component(s) 335. For instance, as agents move units from one location to another location (during receiving, picking, or some other operation), such movements may be recorded with agent components 335 utilized by the agents. For instance, as an agent moves an item from a first location to a second location, an agent may scan the item out of the first location by scanning the first location and the unit and/or may scan the item into the second location by scanning the second location and the unit. Such scanning may include electronically obtaining an identifier for the unit and the location from where the unit is being taken or the location to which the unit is being moved. (In some cases, the location from which a unit is removed need not be scanned. Instead, the control system may determine or infer the location from which a unit is removed based on the unit's last known location as recorded by the control system in inventory model 325.) For example, such scanning may include obtaining an identifier via an optical scanner (e.g., bar code scanner) or RFID scanner. In response, the control system may generate a stored data record (e.g., a record in inventory model 325) indicating the unit has left the corresponding location. A similar process may be performed when placing the unit at its new location. For example, an agent may scan an item and scan the location to which that item is being placed (e.g., a particular conveyance receptacle). In a similar manner as that described above, the control system may generate a stored data record indicating the unit has arrived at the new location. In this manner, control system 102 may in various embodiments track the location of a given unit throughout that unit's entire lifecycle in the materials handling facility (e.g., from receiving 80 to shipping 70). In some cases, the above-described tracking of units may be performed by an inventory management component, which may be a component of control system 102 or a separate component configured to communicate with control system 102.

In some cases, control system 102 may utilize automated devices or systems to track inventory within the materials handling facility. These elements are illustrated as monitoring components 330. For instance, as units move from one location to another within the materials handling facility (e.g., on a conveyance mechanism or cart), monitoring components, such as optical or RFID scanners controlled by a computer system, may electronically obtain identifiers of units during such movement (e.g., by scanning an optical identifier or RFID tag). Such information may be collected by control system 102 and/or an inventory management component in order to track inventory units within the materials handling facility.

The location of a given unit (e.g., an inventory location, conveyance receptacle, or another location of the materials handling facility) may be recorded in inventory model 325. This model may be updated in a real-time or near real-time fashion. In some embodiments, process control component 300 may generate process model 305 at least in part on inventory model 325. For instance, as unit handling processes process units, such units may be moved from location to another within the materials handling facility (e.g., from inventory to conveyance receptacles, from conveyance receptacles to induction stations, from induction stations to the random access storage buffer, from the random access storage buffer 220 to packing stations, etc.). This movement of units may be tracked in inventory model 325; process control component 300 may generate process model 305 based on the inventory model.

Pick instructions 356 may be provided to control system 102, which may be routed to respective agent components 335. Agents 200 may pick units into conveyance receptacles 205 in accordance with such pick instructions. From this point, conveyance receptacles may be conveyed to induction stations 210 and processed according to the description of FIG. 2. By providing picking plan 352, which specifies one or more target throughput rates for picking, to pick management component 325, process control component 300 may control the throughput rate of the picking process. As described in more detail below, the actual throughput rate of the picking process (as well as subsequent processes) may be less than or greater than the target throughput rate specified by the process control component. This may occur due to variabilities within the materials handling facility, such as agents working slower or faster than expected. Other variabilities may be caused by the temporary slowdown or closure of induction stations or packing stations, for example. In some cases, a processing slowdown in one unit handling process may trickle up to one or more upstream processes. The current state of each unit handling process may be reflected in process model 305 on a real-time or near real-time basis. Likewise, process control component 300 may monitor the state of each unit handling process by monitoring process model 305 on a real-time or near real-time basis.

As described above, process control component 300 may, via picking plan 352, provide a target throughput rate for the picking process performed in the materials handling facility. In various embodiments, variabilities within the materials handling facility may cause the actual throughput rate of the picking process to deviate from the target throughput rate. Process control component 300 may be configured to detect such deviation and temporarily alter the target throughput rate in order to bring the average throughput rate of the picking process closer to the original target throughput rate. This process is described in more detail with respect to FIG. 4 below.

Figure 4:
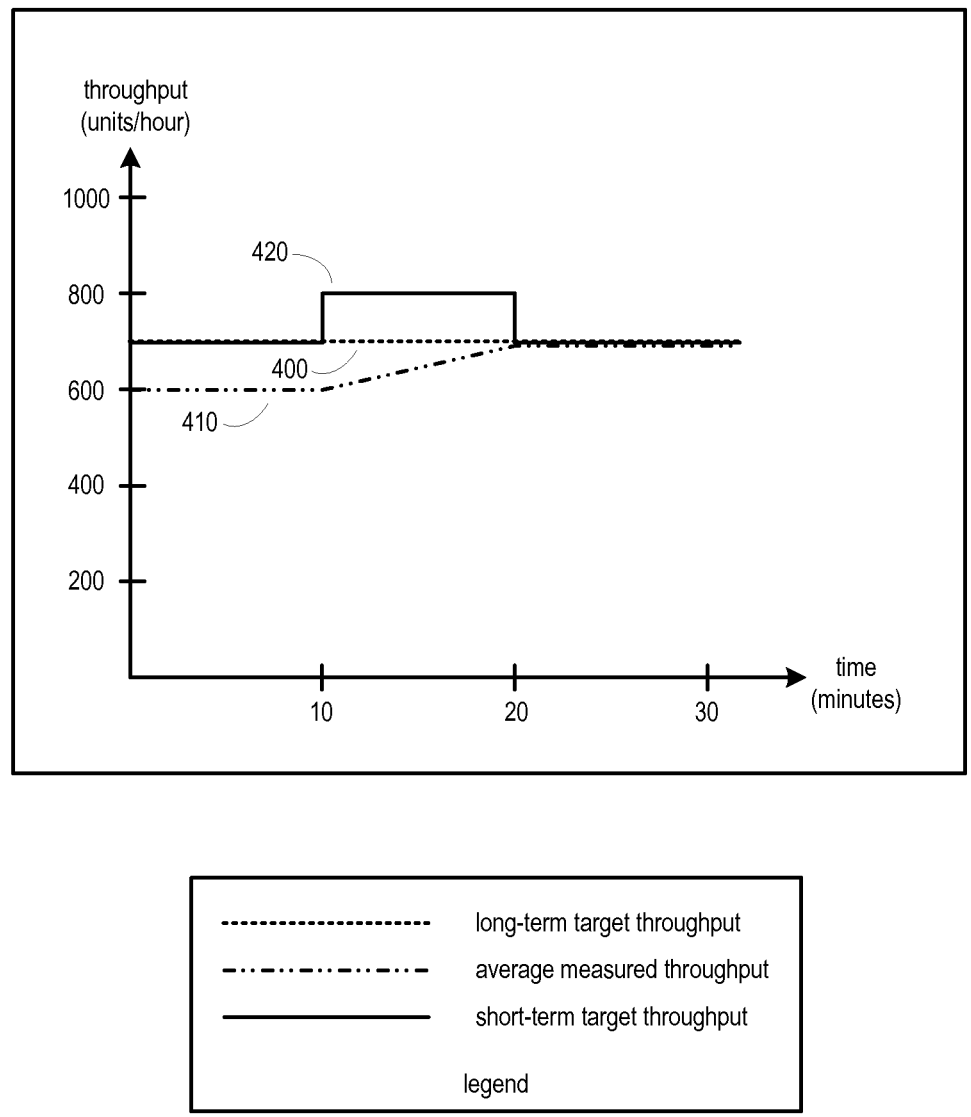
FIG. 4 illustrates a graph of measured and target throughput rates, according to some embodiments.

FIG. 4 illustrates an example plot of throughput rates of a picking process in the materials handling facility (e.g., the process of picking units from inventory 30 into conveyance receptacles 205). In the illustrated embodiment, line 400 represents a long-term target throughput rate for the picking process. In various embodiments, this may be the target throughput rate described above as being determined based on the target output rate of the packing process and the constraints of the materials handling facility (e.g., some items, such as the random access storage buffer may have a fixed capacity). The process control component may be configured to determine that the measured throughput rate of the picking process deviates from the long-term target throughput rate in a first time period. For instance, the measured target throughput rate during the first time interval of FIG. 4 (i.e., 0<time<10 minutes) may be 600 units per hour whereas the long-term target throughput rate is 700 units per hour. This deviation may be caused by variabilities within the materials handling facility, such as staffing levels or agent performance.

As illustrated by line 410, the measured throughput rate of the picking process is illustrated as a running average. The process control component may correct the measured throughput rate of the picking process by temporarily using a short-term target throughput rate chosen to bring the measured throughput in line with the long-term target throughput rate. In various embodiments, the throughput rate of the picking process (or any other unit handling process of the materials handling facility) may be measured by control system 102 (e.g., based on input from the illustrated monitoring or agent components and/or based on inventory model 325) and provided to process control component 300 as illustrated by throughput rate(s) 364. Process control component 300 may utilize this feedback information to update picking plan 352 (or generate a new picking plan). For instance, in the illustrated embodiment, since the throughput of the picking process (e.g., as specified by throughput rates 364) is 100 units per hour less than the long-term target throughput rate, the short term target throughput rate 420 is chosen to be 100 units per hour more than the long-term target throughput rate such that the projected average throughput will converge to 700 units per hour. To control the picking process in this manner, the process control component may issue a new picking plan 352 valid for a temporary time period (e.g., 10<time<20 minutes). The picking plan may indicate the short-term throughput rate to be utilized during this time period.

In the illustrated embodiment, in response to the short-term target throughput rate, the throughput rate of the picking process may temporarily exceed the long-term target throughput rate. As illustrated by line 410, this may improve the average measured throughput of the picking process such that the average throughput converges to the long-term target throughput rate (at time=20 minutes). While this convergence is illustrated as a linear change in average measured throughput, such change need not be linear in all cases. For instance, in other cases, this change may be approximated by an exponential decay or some other form. At this point, the target throughput rate may be returned to the long-term value (e.g., 700 units per hour). Should future variabilities cause the measured throughput to deviate from the long-term target throughput rate, the above described process may be performed one or more times.

In various embodiments, the units of the materials handling facility may be categorized into different collections of units based on physical location. The process model described above may include a stored representation of each collection of units and the composition of such collection (e.g., the type and quantity of units in the collection) on a real-time or near real-time basis. In various embodiments, the units of inventory 30 may belong to one collection, the units of conveyance receptacles 205 may belong to another collection of units, the units stored in the random access storage buffer may belong to yet another collection of units, and so on. In various embodiments, each unit handling process may move units of one collection of units to another collection of units. For instance, a picking process may move units from a collection of units in inventory to a collection of units formed by the contents of conveyance receptacles 205. In various embodiments, some collections of units may be limited in capacity. For instance, in some embodiments, the random access storage buffer 220 may have a fixed capacity. Accordingly, the collection of units stored in the random access storage buffer may also have a fixed capacity. Should this capacity be reached (i.e., should the buffer become full), this may in some cases negatively impact the throughput of the unit handling processes. For instance, if the random access storage buffer 220 were to become gridlocked, undesirable quantities of units could accumulate in one or more upstream processes. In various embodiments, process control component 300 may be configured to determine that a given collection of units has reached a threshold capacity and reduce one or more target throughput rates in order to alleviate the strain on that collection of units. For instance, in an example where the collection of units in the random access storage buffer reaches a threshold value of the buffer's capacity (e.g., 85% of the buffer's capacity), the process control component may reduce the target throughput rate of the picking process such that less units are sent to the random access storage buffer. In different cases, the updated target throughput rate may be valid indefinitely or for only a short time period.

Returning to FIG. 3, in addition to generating an updated picking plan 352 as described with respect to FIG. 4, the process control component may be configured to control the throughput rates of unit handling processes by generating alerts 358, recommendations 360, and a visual representation 362. Each of these elements may be provided to one or more operations management interfaces, such as operations management interface(s) 310. One example of an operations management interface may be a computer system or other electronic device configured to provide information to a management entity, such as by displaying information on a visual display or generating audible information through a speaker or other transducer.

In various embodiments, process control component 300 may be configured to monitor process model 305 to ensure that each process is meeting a minimum throughput rate. If a given unit handling process fails to meet such minimum throughput rate, the process control component may generate an alert, which may be provided to one or more of the management interfaces. In other cases, alerts may be generated in response to determining that an undesirable quantity of units have accumulated in an area of the materials handling facility. For instance, if a quantity of units stored within random access storage buffer 220 exceeds a maximum allowed threshold (e.g., 90% of the buffers capacity), the process control component may generate an alert to notify a management entity about the accumulation.

In addition to alerts or as an alternative to alerts, the process control component may be configured to generate one or recommendations 360, which may be provided to one or more of the management interfaces. Recommendations 360 may be triggered in a manner similar to the alerts described above; however, recommendations 360 may also specify one or more actions to take to alleviate problems within the materials handling facility. For instance, if a backup of units occurs or a unit handling process does not meet a required throughput, the recommendations may include solutions to alleviate those conditions, such as increasing staffing levels (e.g., increasing the quantity of agents) or temporarily reducing the quantity of items picked from inventory.

In various embodiments, process control component 300 may also be configured to generate a visual representation 362 of process model 305. One example of a visual representation 362 may be generated on an electronic display. The visual representation may convey information about the unit handling processes in a graphical manner. In one non-limiting, each unit handling process may be represented graphically with directional arrows indicating process flow. The visual representation may also include various metadata about the unit handling process represented in a graphical manner, such as text or colors that indicates flow rates of the various unit handling processes. In some cases, instead of or in addition to relying on alerts and/or recommendations, management entities may monitor visual representation 362 for problems or backups within the facility and take action as they see fit.

Example Methods

Embodiments of the system and method for process management in a materials handling facility may include various methods, such as those of FIGS. 5-7 described below. In various embodiments, these methods may be implemented on a computer system, such as that of FIG. 8 described below. In various embodiments, the methods described herein may be performed by process control component 300 described above, which may also be implemented on a computer system, such as that of FIG. 8 described below.

FIG. 5 illustrates an example method for generating a model of the unit handling processes in the materials handling facility and utilizing that model to control the throughput of such processes. As illustrated by block 500, the method may include generating a stored model of multiple unit handling processes of a materials handling facility. Examples of such processes may include any of the unit handling process described above including but not limited to a picking process for picking units of items from inventory, a conveyance process for conveying units between locations of the materials handling facility, an induction process for singulating and moving items into a random access storage buffer including multiple unit locations, and a packing process for preparing shipments of units to be shipped from the materials handling facility. One example of such a model is described above with respect to process model 305.

In various embodiments, for each unit handling process modeled, the generated model may indicate real-time, near real-time and/or historical throughput rates for that unit handling process. In some cases, some unit handling process may be performed according to a particular order (e.g., picking is performed before induction, which is performed before packing, etc.). In various embodiments, the generated model may specify this order.

As illustrated by block 502, the method may include, based on at least one target output rate that is a goal for the output rate of a given unit handling process (e.g., a packing process) of the multiple unit handling processes, evaluating the model to generate a particular target throughput rate that is a goal for the respective throughput rate of a particular unit handling process (e.g., a picking process) that is performed prior to the given unit handling process. For example, as described above, a management entity may specify a target output rate for the packing process of the materials handling facility (e.g., 700 UPH). Based on this target output rate, the method may include determining the desired target throughput rate for one or more upstream processes all the way up to the picking process. In one embodiment, the target throughput rate of each unit handling process may be determined as being equivalent to the target output rate provided by a management entity. In other cases, the target throughput rate of one or more upstream processes may be different than the target output rate while still being derived from that target output rate.

As illustrated by block 504, the method may also include, based on the particular target throughput rate for the particular unit handling process (e.g., a target throughput rate for a picking process), generating one or more instructions to control the respective throughput rate of units processed by the particular unit handling process. One example of such instructions is described above with respect to picking plan 352, which may specify one or more target throughput rates for the picking process. In some cases, generating the instructions may include directly generating pick instructions, such as pick instructions 356 described above.

Figure 6:
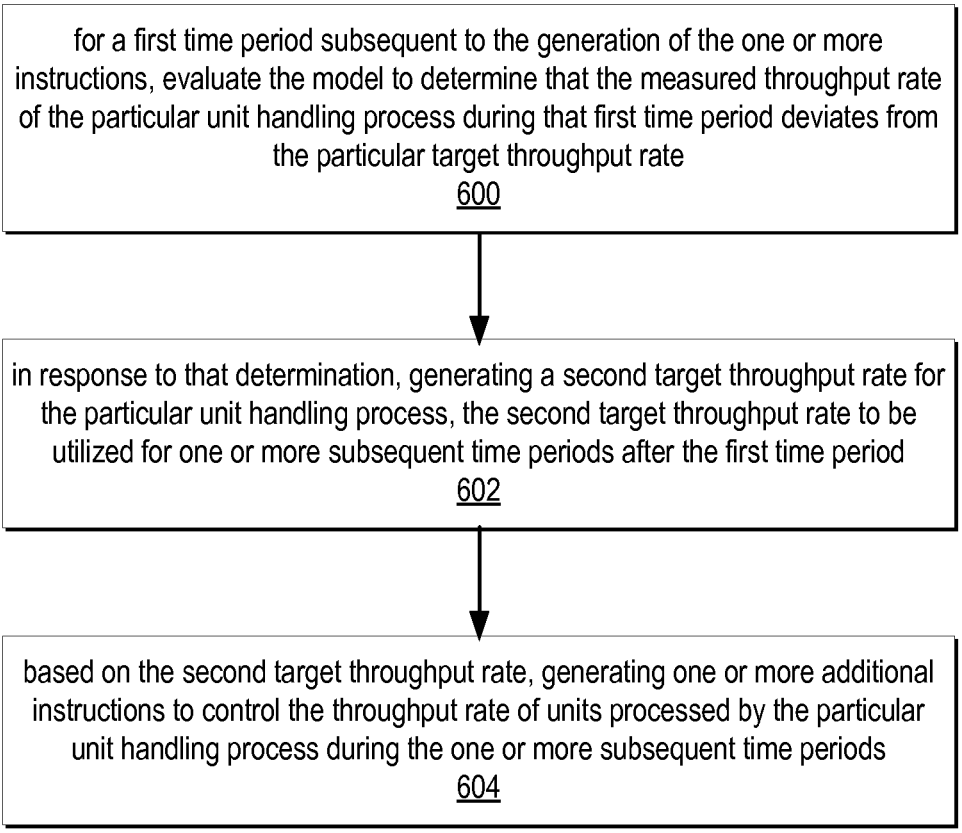
FIG. 6 illustrates a flowchart of an example method for generating and utilizing a second target throughput rate.

FIG. 6 illustrates a flowchart of an example method for at least temporarily altering the target throughput rate of a unit handling process, such as illustrated by the short term target throughput rate of FIG. 4 described above. In some embodiments, the illustrated method may be performed after the method described above with respect to FIG. 5. As illustrated at 600, the method may include, for a first time period subsequent to the generation of the one or more instructions (e.g., the instructions described with respect to block 504), evaluating the model to determine that the measured throughput rate of a particular unit handling process (e.g., a picking process) during that first time period deviates from the particular target throughput rate for that unit handling process. One example of determining such a deviation is a determination that the measured throughput rate of a picking process is below (or above) the target throughput rate for the picking process. For instance, such a determination may include a process control component determining that the measured throughput of the picking process is 100 units per hour less than the target throughput rate, as described above with respect to the first time period (0<time<10 minutes) of FIG. 4.

As illustrated by block 602, the method may also include, in response to the determination of block 600, generating a second target throughput rate for the particular unit handling process. This second target throughput rate may be utilized for one or more subsequent time periods, similar to the short-term target throughput rate described above with respect to FIG. 4. For instance, the second target throughput rate may be used temporarily to overcome a transient condition within the materials handling, such as the measured throughput rate of a unit handling process deviating from a respective target throughput rate. An example of using a second target throughput rate in this manner is described above with respect to the second time period (10<time<20 minutes) of FIG. 4.

As illustrated by block 604, the method may also include, based on the second target throughput rate, generating one or more additional instructions to control the throughput rate of units processed by the particular unit handling process during the one or more subsequent time periods. For example, this portion of the method may include temporarily altering a picking plan (e.g., picking plan 352) to reflect new instructions valid for the one or more subsequent time periods or generating a new picking plan altogether for the one or more or more subsequent time periods. In the example of FIG. 4, controlling the picking process in this manner brings the average measured throughput rate up to the long-term target throughput rate, after which the use of the long-term target throughput rate for controlling the picking process may be resumed.

As described above, in various embodiments, the units of the materials handling facility may be categorized into different collections of units based on physical location. The process model described above may include a stored representation of each collection of units and the composition of such collection (e.g., the type and quantity of units in the collection) on a real-time or near real-time basis. In various embodiments, the units of inventory 30 may belong to one collection, the units of conveyance receptacles 205 may belong to another collection of units, the units stored in the random access storage buffer may belong to yet another collection of units, and so on. In various embodiments, each unit handling process may move units of one collection of units to another collection of units. For instance, a picking process may move units from a collection of units in inventory to a collection of units formed by the contents of conveyance receptacles 205. In various embodiments, some collections of units may be limited in capacity. For instance, in some embodiments, the random access storage buffer 220 may have a fixed capacity. Accordingly, the collection of units stored in the random access storage buffer may also have a fixed capacity. Should this capacity be reached (i.e., should the buffer become full), this may in some cases negatively impact the throughput of the unit handling processes. For instance, if the random access storage buffer 220 were to become gridlocked, undesirable quantities of units could accumulate in one or more upstream processes. Embodiments may include methods for avoiding such situations, such as the method of FIG. 7 described below.

Figure 7:
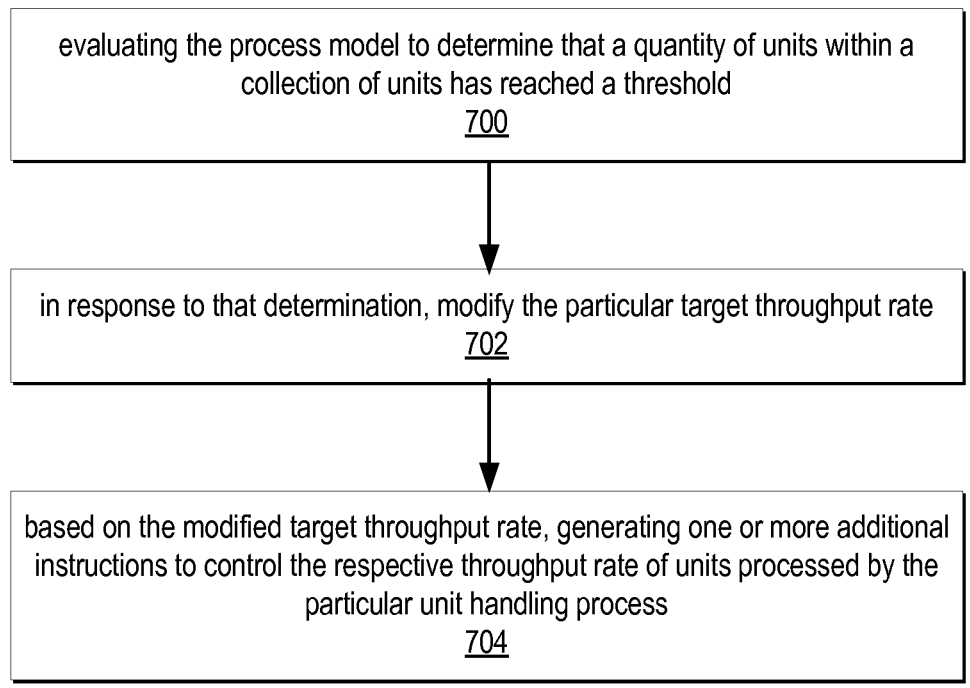
FIG. 7 illustrates a flowchart of an example method for modifying a target throughput rate in response to a collection of units reaching a threshold quantity.

FIG. 7 illustrates a flowchart of an example method for adjusting the target throughput rate in response to a threshold capacity of a collection of units being reached. As illustrated by block 700, the method may include evaluating the process model (e.g., process model 305) to determine that a quantity of units within a collection of units has reached a threshold. For instance, in an example where the collection of units is a collection of the units of the random access storage buffer, the method may include determining that the quantity of units in the random access storage buffer has reached a threshold level, such as 85% of buffer capacity (or some other threshold). In other examples, a lower-bound threshold may be utilized. For example, in some embodiments, the method may include evaluating the process model (e.g., process model 305) to determine that a quantity of units within the random access storage buffer is below 50% of the buffer's capacity.

As illustrated by block 702, the method may also include, in response to the determination of block 702, modifying the particular target throughput rate. For instance, the target throughput rate of the picking process may be reduced by 20% or some other amount in order to reduce strain on the random access storage buffer by reducing the quantity of units sent to the buffer. Of course, in other examples, the target throughput rate may be reduced by some other amount. In cases where a lower-bound threshold is utilized, modifying the target throughput rate may include increasing the particular target throughput rate.

As illustrated by block 704, the method may include, based on the modified target throughput rate, generating one or more additional instructions to control the respective throughput rate of units processed by the particular handling process. In an example where an upper-bound threshold is reached, this may include generating a new picking plan 352 that specifies the quantity of units to be picked during a given time period (e.g., the target throughput rate) should be reduced (or modifying the existing picking plan to indicate the target throughput rate reduction). In an example where a lower-bound threshold is reached, this may include generating a new picking plan 352 that specifies the quantity of units to be picked during a given time period (e.g., the target throughput rate) should be increased (or modifying the existing picking plan to indicate the target throughput increase). In various embodiments, the new target throughput rate could apply indefinitely (e.g., a long-term target throughput rate) or temporarily (e.g., a short-term target throughput rate).

While the method of FIG. 7 primarily addresses situations in which a collection of units reaches an upper limit threshold, similar techniques could be applied to a collection of units reaching a lower limit threshold. In one example, in response to determining that the capacity of the random access storage buffer is underutilized, the method could include increasing the target throughput rate utilized for the picking process.

Example Computer System

Various embodiments of the system and method for process management in a materials handling facility, as described herein, may be executed on one or more computer systems, which may interact with various other devices. Note that any component, action, or functionality described above with respect to FIGS. 1-7 may be implemented via one or more computer systems configured as computer system 800 of FIG. 8, according to various embodiments. In the illustrated embodiment, computer system 800 includes one or more processors 810 coupled to a system memory 820 via an input/output (I/O) interface 830. Computer system 800 further includes a network interface 840 coupled to I/O interface 830, and one or more input/output devices 850, such as cursor control device 860, keyboard 870, and display(s) 880. In some cases, it is contemplated that embodiments may be implemented using a single instance of computer system 800, while in other embodiments multiple such systems, or multiple nodes making up computer system 800, may be configured to host different portions or instances of embodiments. For example, in one embodiment some elements may be implemented via one or more nodes of computer system 800 that are distinct from those nodes implementing other elements.

In various embodiments, computer system 800 may be a uniprocessor system including one processor 810, or a multiprocessor system including several processors 810 (e.g., two, four, eight, or another suitable number). Processors 810 may be any suitable processor capable of executing instructions. For example, in various embodiments processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

System memory 820 may be configured to store program instructions 822 and/or data 832 accessible by processor 810. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions 822 implementing process control component 300 are shown stored within program instructions 822. Additionally, data 832 of memory 820 may store any of the information or data structures described above, such as process model 305. In some embodiments, program instructions and/or data may be received, sent or stored upon different types of computer-accessible media or on similar media separate from system memory 820 or computer system 800. While computer system 800 is described as implementing the functionality of process control component 300, any of the components or systems illustrated above may be implemented via such a computer system.

In one embodiment, I/O interface 830 may be configured to coordinate I/O traffic between processor 810, system memory 820, and any peripheral devices in the device, including network interface 840 or other peripheral interfaces, such as input/output devices 850. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices (e.g., any other component of the Figures described above) attached to a network 885 (e.g., any element of FIG. 3) or between nodes of computer system 800. Network 885 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 840 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 850 may, in some embodiments, include one or more display terminals, keyboards, keypads, touchpads, scanning devices, voice or optical recognition devices, or any other devices suitable for entering or accessing data by one or more computer systems 800. Multiple input/output devices 850 may be present in computer system 800 or may be distributed on various nodes of computer system 800. In some embodiments, similar input/output devices may be separate from computer system 800 and may interact with one or more nodes of computer system 800 through a wired or wireless connection, such as over network interface 840.

As shown in FIG. 8, memory 820 may include program instructions 822 configured to implement any element or action described above. In one embodiment, the program instructions may implement the methods described above, such as the method illustrated by FIGS. 5-7. In other embodiments, different elements and data may be included. Note that data 832 may include any data or information described above.

Those skilled in the art will appreciate that computer system 800 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 800 may be transmitted to computer system 800 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A computing system, comprising:
  a memory; and
  one or more processors coupled to the memory, wherein the memory comprises program instructions executable by the one or more processors to implement a process control component configured to:
    generate within the memory a stored model of multiple unit handling processes of a materials handling facility, wherein for each unit handling process the model indicates a measured throughput rate at which that unit handling process processes units, wherein at least some of the multiple unit handling processes are different types of downstream unit handling processes that are downstream from a storage buffer and process units obtained from the storage buffer in order to prepare shipments of units to be shipped from the materials handling facility, wherein at least another one or more of the multiple unit handling processes is an upstream unit handling process that is upstream from the storage buffer and provides units to the storage buffer, wherein the upstream unit handling process provides units that are bound for the different types of downstream unit handling processes, and wherein each unit is bound for a particular one of the different types of downstream unit handling processes;

based on at least one target output rate that is a goal for the output rate of a given type of downstream unit handling process of the multiple unit handling processes, evaluate the model to generate a particular target throughput rate that is a goal for the respective throughput rate of the upstream unit handling process for units bound for the given type of downstream unit handling process; and based on the particular target throughput rate generated for the upstream unit handling process, generate one or more instructions to control the respective throughput rate of units bound for the given type of downstream unit handling process and processed by the upstream unit handling process.

2. The computing system of claim 1, wherein the one or more instructions that are generated include one or more instructions to control a rate at which units bound for the given type of downstream unit handling process are picked from inventory.

3. The computing system of claim 1, wherein the process control component is configured to:

for a first time period subsequent to the generation of said one or more instructions, evaluate the model to determine that the measured throughput rate of the upstream unit handling process for units bound for the given type of downstream unit handling process during that first time period deviates from the particular target throughput rate; and in response to that determination, generate a second target throughput rate for the upstream unit handling process for units bound for the given type of downstream unit handling process, the second target throughput rate to be utilized for one or more subsequent time periods after the first time period; and based on the second target throughput rate, generate one or more additional instructions to control the throughput rate of units bound for the given type of downstream unit handling process and processed by the upstream unit handling process during said one or more subsequent time periods.

4. The computing system of claim 3, wherein the second target throughput rate is generated such that an average of the measured throughput rate of the upstream unit handling process for units bound for the given type of downstream unit handling process during the first time period and the second target throughput rate utilized during said one or more subsequent time periods is equal to the particular target throughput rate for the upstream unit handling process for units bound for the given type of downstream unit handling process.

5. The computing system of claim 3, wherein after the one or more subsequent time periods, the process control component is configured to utilize the particular target throughput rate again to generate one or more instructions to control the respective throughput rate of units bound for the given type of downstream unit handling process and processed by the upstream unit handling process.

6. The computing system of claim 1, wherein the stored model further indicates units that are part of different collections of units, wherein at least some of said unit handling processes move items from one collection of units to another collection of units.

7. The computing system of claim 6, wherein the process control component is configured to:

evaluate the model to determine that a quantity of units within one of said collections of units has reached a threshold, wherein the units of the quantity of units are bound for the given type of downstream unit handling process; and in response to that determination, modify the particular target throughput rate, and based on the modified target throughput rate, generate one or more additional instructions to control the respective throughput rate of units bound for the given type of downstream unit handling process and processed by the upstream unit handling process.

8. The computing system of claim 6, wherein the process control component is configured to:

evaluate the model to determine that a quantity of units within one of said collections of units has reached a threshold; and in response to that determination, generate one or more of: an alert message to alert an agent that the threshold has been reached, or a recommendation message to provide a recommendation for modifying the quantity of units within the respective collection of units.

9. The computing system of claim 8, wherein said recommendation indicates a change in a quantity of labor staffed on one or more of said unit handling processes.

10. The system of claim 6, wherein the storage buffer is a random access storage buffer, and wherein the units of at least one of said collections of units are stored within the random access storage buffer comprising multiple unit locations.

11. The computing system of claim 1, wherein the multiple unit handling processes include one or more of:

a picking process to pick units from one or more inventory locations;

a conveyance process to convey units from one location of the materials handling facility to another location of the materials handling facility;

an induction process for moving units into a random access storage buffer compressing multiple unit locations; or a packing process during which one or more units received from the random access storage buffer are packed into respective shipping containers to be shipped from the materials handling facility.

12. The computing system of claim 1, wherein the at least one target output rate for the given type of downstream unit handling process is based on: a rate at which units are expected to be packed into shipments prior to being shipped from the materials handling facility or a rate at which shipments are expected to be processed within the materials handling facility.

13. A method, comprising:

performing, by one or more computing devices implementing a process control component for a materials handling facility:

generating within a memory accessible to the process control component a model of multiple unit handling processes of the materials handling facility, wherein for each unit handling process the model indicates a measured throughput rate at which that unit handling process processes units, wherein at least some of the multiple unit handling processes are different types of downstream unit handling processes that are downstream from a storage buffer and process units obtained from the storage buffer in order to prepare shipments of units to be shipped from the materials handling facility, wherein at least another one or more of the multiple unit handling processes is an upstream unit handling process that is upstream from the storage buffer and provides units to the storage buffer, wherein the upstream unit handling process provides units that are bound for the different types of downstream unit handling processes, and wherein each unit is bound for a particular one of the different types of downstream unit handling processes;

based on at least one target output rate that is a goal for the output rate of a given type of downstream unit handling process of the multiple unit handling processes, evaluating the model to generate a particular target throughput rate that is a goal for the respective throughput rate of the upstream unit handling process for units bound for the given type of downstream unit handling process; and based on the particular target throughput rate generated for the upstream unit handling process, generating one or more instructions to control the respective throughput rate of units bound for the given type of downstream unit handling process and processed by the upstream unit handling process.

14. The method of claim 13, wherein the one or more instructions include one or more instructions to control a rate at which units bound for the given type of downstream unit handling process are picked from inventory.

15. The method of claim 13, wherein the method comprises:

for a first time period subsequent to the generation of said one or more instructions, evaluating the model to determine that the measured throughput rate of the upstream unit handling process for units bound for the given type of downstream unit handling process during that first time period deviates from the particular target throughput rate; and in response to that determination, generating a second target throughput rate for the upstream unit handling process for units bound for the given type of downstream unit handling process, the second target throughput rate to be utilized for one or more subsequent time periods after the first time period; and based on the second target throughput rate, generating one or more additional instructions to control the throughput rate of units bound for the given type of downstream unit handling process and processed by the upstream unit handling process during said one or more subsequent time periods.

16. The method of claim 15, wherein the second target throughput rate is generated such that an average of the measured throughput rate of the upstream unit handling process for units bound for the given type of downstream unit handling process during the first time period and the second target throughput rate utilized during said one or more subsequent time periods is equal to the particular target throughput rate for the upstream unit handling process for units bound for the given type of downstream unit handling process.

17. The method of claim 15, wherein subsequent to the one or more subsequent time periods, the method comprises utilizing the particular target throughput rate again to generate one or more instructions to control the respective throughput rate of units bound for the given type of downstream unit handling process processed by the upstream unit handling process.

18. The method of claim 13, wherein the stored model further indicates units that are part of different collections of units, wherein at least some of said unit handling processes move items from one collection of units to another collection of units.

19. The method of claim 18, wherein the method comprises:

evaluating the model to determine that a quantity of units within one of said collections of units has reached a threshold, wherein the units of the quantity of units are bound for the given type of downstream unit handling process; and in response to that determination, modifying the particular target throughput rate, and based on the modified target throughput rate, generating one or more additional instructions to control the respective throughput rate of units bound for the given type of downstream unit handling process processed by the upstream unit handling process.

20. The method of claim 18, wherein the method comprises:

evaluating the model to determine that a quantity of units within one of said collections of units has reached a threshold; and in response to that determination, generating one or more of: an alert message to alert an agent that the threshold has been reached, or a recommendation message to provide a recommendation for modifying the quantity of units within the respective collection of units.

21. The method of claim 20, wherein said recommendation indicates a change in a quantity of labor staffed on one or more of said unit handling processes.

22. The method of claim 18, wherein the storage buffer is a random access storage buffer, and wherein the units of at least one of said collections of units are stored within the random access storage buffer comprising multiple unit locations.

23. The method of claim 13, wherein the multiple unit handling processes include one or more of:

a picking process to pick units from one or more inventory locations;

a conveyance process to convey units from one location of the materials handling facility to another location of the materials handling facility;

an induction process during which units are moved into a random access storage buffer compressing multiple unit locations; or a packing process during which one or more units received from the random access storage buffer are packed into respective shipping containers to be shipped from the materials handling facility.

24. The method of claim 13, wherein the at least one target output rate for the given type of downstream unit handling process is based on: a rate at which units are expected to be packed into shipments prior to being shipped from the materials handling facility or a rate at which shipments are expected to be processed within the materials handling facility.

25. A non-transitory computer-readable storage medium, storing program instructions computer-executable on a computer system to implement a process control component configured to:
- generate within a memory a stored model of multiple unit handling processes of a materials handling facility, wherein for each unit handling process the model indicates a measured throughput rate at which that unit handling process processes units, wherein at least some of the multiple unit handling processes are different types of downstream unit handling processes that are downstream from a storage buffer and process units obtained from the storage buffer in-order to prepare shipments of units to be shipped from the materials handling facility, wherein at least another one or more of the multiple unit handling processes is an upstream unit handling process that is upstream from the storage buffer and provides units to the storage buffer, wherein the upstream unit handling process provides units that are bound for the different types of downstream unit handling processes, and wherein each unit is bound for a particular one of the different types of downstream unit handling processes;
- based on at least one target output rate that is a goal for the output rate of a given type of downstream unit handling process of the multiple unit handling processes, evaluate the model to generate a particular target throughput rate that is a goal for the respective throughput rate of the upstream unit handling process for units bound for the given type of downstream unit handling process; and
- based on the particular target throughput rate generated for the upstream unit handling process, generate one or more instructions to control the respective throughput rate of units bound for the given type of downstream unit handling process and processed by the upstream unit handling process.

26. The non-transitory computer-readable storage medium of claim 25, wherein the one or more instructions include one or more instructions to control a rate at which units bound for the given type of downstream unit handling process are picked from inventory.

27. The non-transitory computer-readable storage medium of claim 25, wherein the process control component is configured to:
- for a first time period subsequent to the generation of said one or more instructions, evaluate the model to determine that the measured throughput rate of the upstream unit handling process for units bound for the given type of downstream unit handling process during that first time period deviates from the particular target throughput rate; and
- in response to that determination, generate a second target throughput rate for the upstream unit handling process for units bound for the given type of downstream unit handling process, the second target throughput rate to be utilized for one or more subsequent time periods after the first time period; and
- based on the second target throughput rate, generate one or more additional instructions to control the throughput rate of units bound for the given type of downstream unit handling process and processed by the upstream unit handling process during said one or more subsequent time periods.

28. The non-transitory computer-readable storage medium of claim 27, wherein the second target throughput rate is generated such that an average of the measured throughput rate of the upstream unit handling process for units bound for the given type of downstream unit handling process during the first time period and the second target throughput rate utilized during said one or more subsequent time periods is equal to the particular target throughput rate for the upstream unit handling process for units bound for the given type of downstream unit handling process.

29. The non-transitory computer-readable storage medium of claim 27, wherein subsequent to the one or more subsequent time periods, the process control component is configured to utilize the particular target throughput rate again to generate one or more instructions to control the respective throughput rate of units bound for the given type of downstream unit handling process and processed by the upstream unit handling process.

30. The non-transitory computer-readable storage medium of claim 25, wherein the stored model further indicates units that are part of different collections of units, wherein at least some of said unit handling processes move items from one collection of units to another collection of units.

31. The non-transitory computer-readable storage medium of claim 30, wherein the process control component is configured to:
- evaluate the model to determine that a quantity of units within one of said collections of units has reached a threshold, wherein the units of the quantity of units are bound for the given type of downstream unit handling process; and
- in response to that determination, modify the particular target throughput rate, and based on the modified target throughput rate, generate one or more additional instructions to control the respective throughput rate of units bound for the given type of downstream unit handling process and processed by the upstream unit handling process.

32. The non-transitory computer-readable storage medium of claim 30, wherein the process control component is configured to:
- evaluate the model to determine that a quantity of units within one of said collections of units has reached a threshold; and
- in response to that determination, generate one or more of: an alert message to alert an agent that the threshold has been reached, or a recommendation message to provide a recommendation for modifying the quantity of units within the respective collection of units.

33. The non-transitory computer-readable storage medium of claim 32, wherein said recommendation indicates a change in a quantity of labor staffed on one or more of said unit handling processes.

34. The non-transitory computer-readable storage medium of claim 30, wherein the storage buffer is a random access storage buffer, and wherein the units of at least one of said collections of units are stored within the random access storage buffer comprising multiple unit locations.

35. The non-transitory computer-readable storage medium of claim 25, wherein the multiple unit handling processes include one or more of:
- a picking process to pick units from one or more inventory locations;
- a conveyance process to convey units from one location of the materials handling facility to another location of the materials handling facility;
- an induction process during which units are moved into a random access storage buffer compressing multiple unit locations; or a packing process during which one or more units received from the random access storage buffer are packed into respective shipping containers to be shipped from the materials handling facility.

36. The non-transitory computer-readable storage medium of claim 25, wherein the at least one target output rate for a given type of unit downstream handling process is based on: a rate at which units are expected to be packed into shipments prior to being shipped from the materials handling facility or a rate at which shipments are expected to be processed within the materials handling facility.

* * * * *